Figure 1:
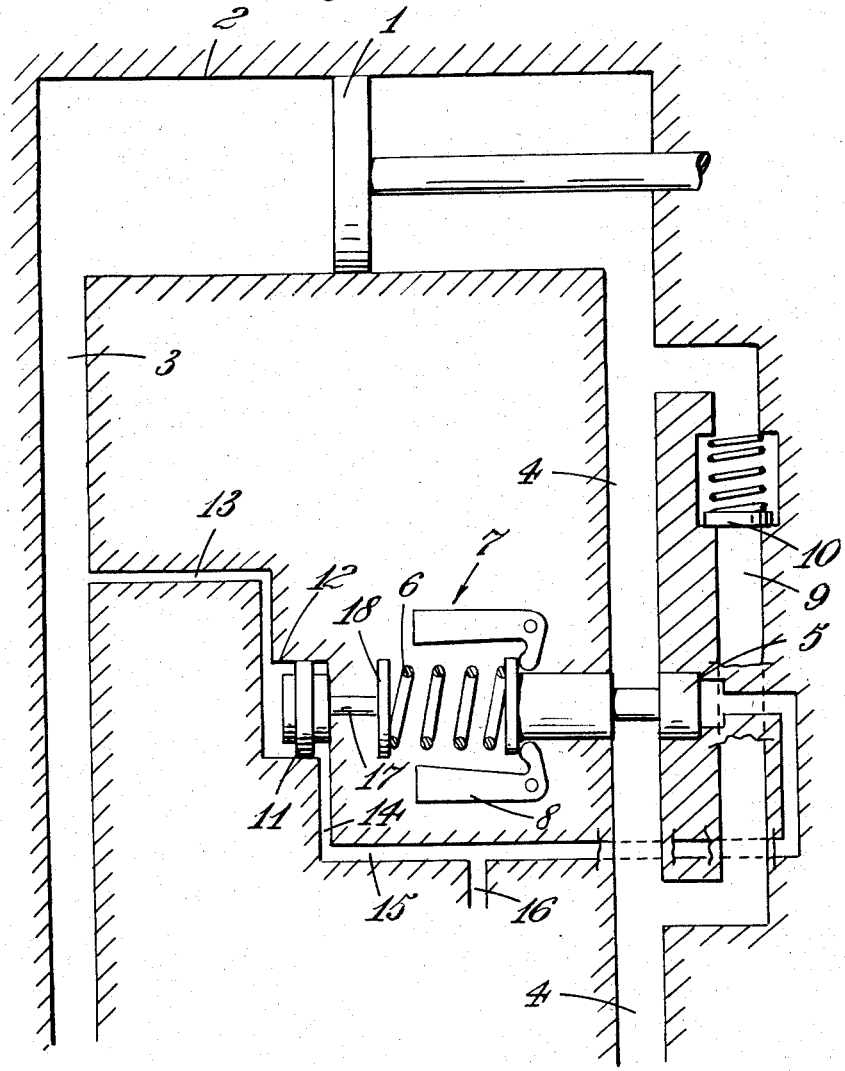

Jan. 20, 1959    L. G. FAIRHURST ET AL    2,869,650
PITCH LOCK VALVE FOR HYDRAULIC VARIABLE PITCH PROPELLERS
Filed May 3, 1956      3 Sheets-Sheet 1

Inventors
L. G. FAIRHURST
ELLIS DANVERS

United States Patent Office 2,869,650
Patented Jan. 20, 1959

2,869,650

PITCH LOCK VALVE FOR HYDRAULIC VARIABLE PITCH PROPELLERS

Leonard Gaskell Fairhurst and Ellis Danvers, Gloucester, England, assignors to Rotol Limited, Gloucester, England, a British company Application May 3, 1956, Serial No. 582,486

Claims priority, application Great Britain May 5, 1955

9 Claims. (Cl. 170—160.21)

This invention relates to hydraulically operated variable pitch propellers of the kind, hereinafter referred to as the kind described, including a double-acting hydraulic pitch change motor actuable by hydraulic fluid under pressure to adjust the pitch of the propeller, an hydraulic fluid conduit (the coarse pitch conduit) for leading hydraulic fluid under pressure to said pitch change motor to actuate the motor in the sense to adjust the pitch of the propeller towards coarse pitch, and an hydraulic fluid conduit (the fine pitch conduit) for leading hydraulic fluid under pressure to said pitch change motor to actuate the motor in the sense to adjust the pitch of the propeller towards fine or reverse pitch.

In United States patent application Serial No. 508,594, filed May 16, 1955, there is described and claimed a hydraulically operated variable pitch propeller of the type in which hydraulic liquid supplied through a coarse pitch conduit is employed in a pitch change motor to increase the pitch of the blades, characterised by the combination with said propeller of a normally open lock valve in said coarse pitch conduit, means for closing the valve in response to the attainment of a propeller speed in excess of a predetermined value, said valve being adapted so that after it has been closed it remains closed when there is an excess of pressure on the pitch change motor side of the valve about that on the other side, and a non-return valve in a by-pass conduit by-passing said lock valve, which non-return valve is arranged to close when the pressure on the pitch change motor side of the non-return valve exceeds that on the other side of the non-return valve.

In this arrangement the means for closing the lock valve is arranged to close the valve when the speed of the propeller exceeds its normal maximum value by a suitable margin, for example 8%. Dangerous overspeeding of the propeller is thus prevented, but the arrangement in the case where it is used in combination with a propeller of the kind described does not prevent fining-off of the propeller pitch in the event of leakage of hydraulic liquid due to a failure in the coarse pitch or fine pitch conduits.

The object of the present invention is to provide a propeller of the kind described in which protection is given both against overspeeding and against loss of pitch due to leakage of hydraulic fluid from the coarse pitch or fine pitch conduit.

According to the present invention a propeller of the kind described is characterised by the combination with the propeller of a normally open lock valve in said coarse pitch conduit, closing means for closing the lock valve in response to the attainment of a propeller speed in excess of a predetermined value, a non-return valve in a by-pass conduit by-passing the lock valve, which non-return valve is arranged to close when the pressure on the pitch change motor side of the non-return valve exceeds that on the other side of the non-return valve, and adjusting means for adjusting said closing means to close the lock valve at a propeller speed below the normal maximum propeller speed when the difference between the pressure in the fine pitch conduit and drain pressure falls below a predetermined value.

The pitch control of variable pitch propellers of the kind described is effected by means of an hydraulic valve which is displaceable from an equilibrium position to supply hydraulic fluid under pressure to said pitch change motor through either said fine pitch conduit or said coarse pitch conduit to adjust the pitch of the propeller towards fine pitch or coarse pitch respectively, and this hydraulic valve is usually controlled by a speed governor, the speed governor and the valve being combined in a constant speed governor unit. The operation of such an hydraulic valve normally involves the generation of transient pressure fluctuations simultaneously in the coarse pitch and fine pitch conduits, such transient pressure fluctuations being of opposite sign in these two conduits. The existence of such transients in the fine pitch conduit makes it difficult to select a pressure difference between drain pressure and the pressure in the fine pitch conduit at which the lock valve shall close to provide an adequate degree of safety without unnecessarily disturbing the normal operation of the propeller.

To obviate this difficulty, according to a feature of the invention, said adjusting means may comprise a first member subject to the difference between the pressure in the fine pitch conduit and drain pressure, a second member subject to the difference between the pressure in the coarse pitch conduit and drain pressure and means for combining the loads produced upon said first and second members by said pressures and for acting upon said closing means with said combined load, the arrangement being such that the combined load remains substantially constant when transient pressure fluctuations of opposite sign occur simultaneously in the coarse pitch conduit and the fine pitch conduit.

Specific embodiments of the present invention will now be described, merely by way of example, with reference to the accompanying drawings in which Figure 1 diagrammatically illustrates one arrangement according to the present invention.

Figure 2:
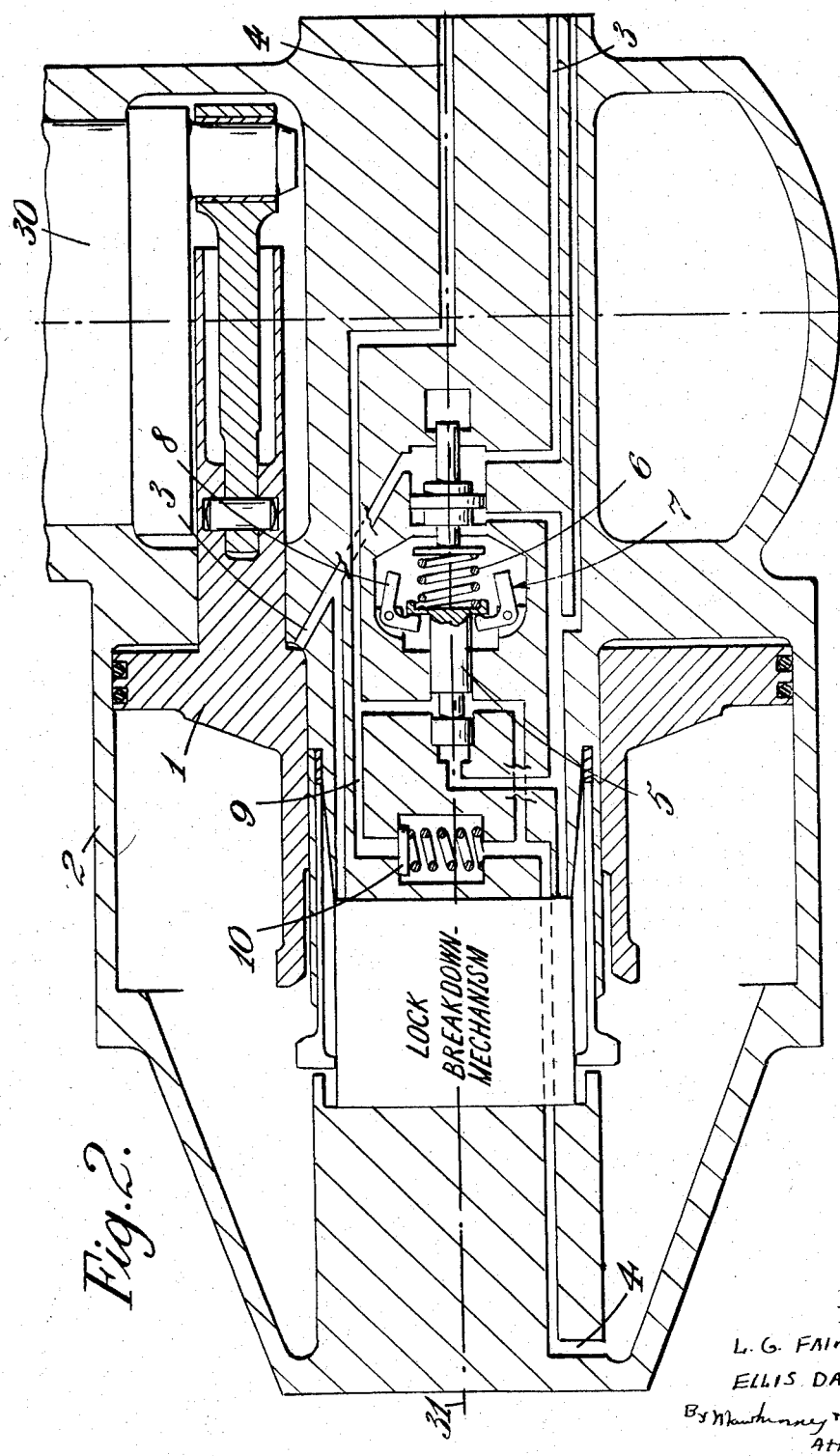
Figure 3:
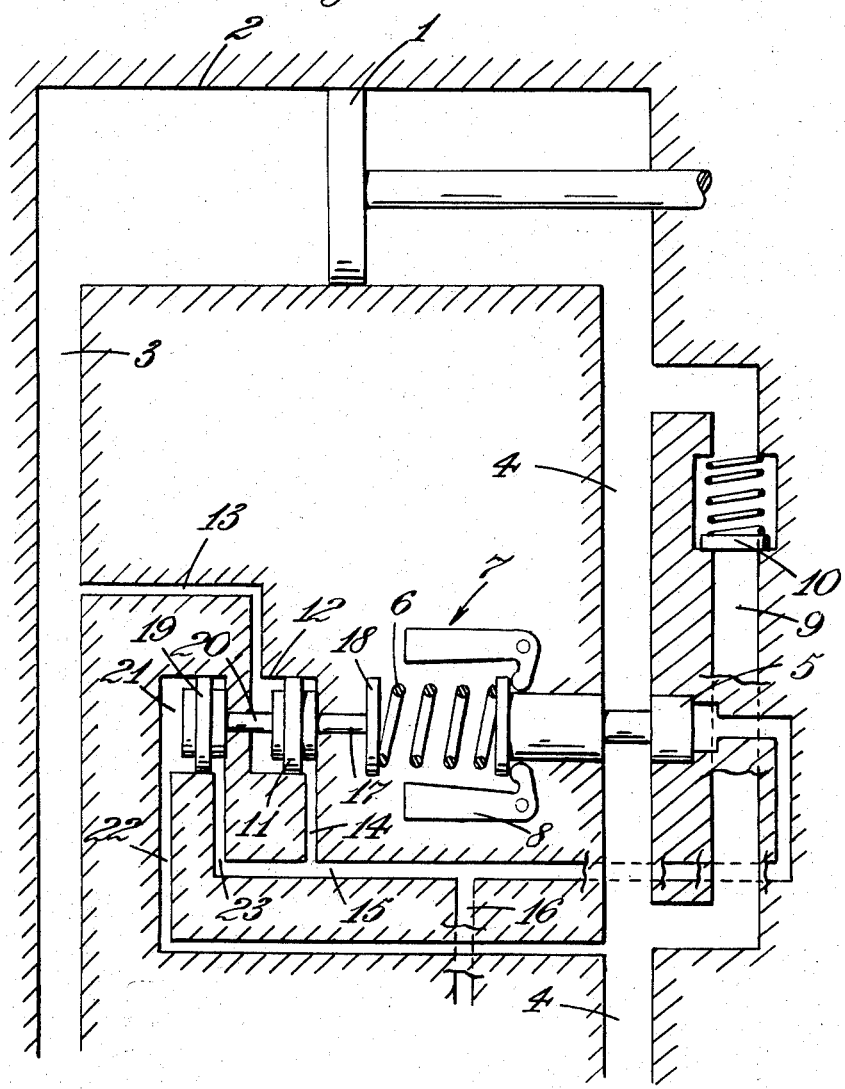

Figure 2 diagrammatically illustrates a propeller according to the invention, incorporating the arrangement of Figure 1, and Figure 3 diagrammatically illustrates a modification of the arrangement shown in Figure 1.

Referring to Figures 1 and 2, the pitch change piston of a double acting hydraulic pitch change motor of a hydraulic variable pitch propeller is represented at 1. The piston is connected to adjust the pitch angle of the blades of the propeller, one of which blades is indicated at 30 in Figure 2, in well-known manner. The piston operates in a cylinder 2 the ends of which are connected by conduits 3 and 4 to the control ports of a constant speed governor unit, not shown. Hydraulic fluid supplied under pressure through the conduit 3 acts on the piston 1, tending to move it in a direction giving a finer pitch setting in ahead pitch of the propeller, or a coarser pitch in the reverse range in the case of a reversing propeller. The conduit 3 is accordingly the fine pitch fluid conduit. Conversely, hydraulic fluid supplied under pressure through the conduit 4 tends to move the piston 1 in a direction giving a coarser pitch setting in ahead pitch of the propeller and the conduit 4 is accordingly the coarse pitch fluid conduit.

A piston type lock-valve 5 is provided in the coarse pitch fluid conduit 4. The valve 5 is normally held open by a coiled compression spring 6, the speeder spring of a flywheel governor 7 having flyweights 8. The governor 7 and valve 5 are arranged in the hub of the propeller along the rotational axis 31 (see Figure 2) of the latter so that the flyweights 8 are subjected to centrifugal forces corresponding to the speed of rotation of the propeller. A somewhat similar arrangement to that just described is described in the specification of United States Patent application Serial No. 508,594. In that specification the speeder spring of the governor is adjusted so as to be overcome by the flyweights of the governor when the speed of the propeller exceeds the normal maximum by a predetermined amount. The lock valve is then closed trapping the coarse pitch fluid in the hydraulic pitch change motor of the propeller and preventing the propeller from moving towards a finer pitch position. In the example at present being described the action of the lock valve 5 is the same. When the valve 5 closes hydraulic fluid is trapped in the cylinder 2 and the propeller is prevented from moving towards fine pitch. The spring 6 may however be set so as to be overcome by the flyweights when the speed of the propeller exceeds a value lower than the normal maximum as will hereinafter be made clear. A by-pass conduit 9 is provided which by-passes the valve 5. The conduit 9 contains a non-return valve 10 arranged to close when the pressure on the pitch change motor side of the valve 10 exceeds that on the other side of the valve 10. The hydraulic fluid trapped in the cylinder consequently cannot escape through the valve 10 but fluid under pressure arriving through the conduit 4 can enter the cylinder 2 through the valve 10 to coarsen the pitch of the propeller as soon as its pressure exceeds the pressure of the fluid trapped in the cylinder 2.

The propeller described in the specification of United States patent application Serial No. 508,594 also includes a by-pass conduit and a non-return valve arranged as just described.

The flyweights 8 acting against the spring 6 constitute closing means for closing the valve 5.

According to the present invention adjusting means are provided for adjusting the closing means to close the valve 5 at a propeller speed below the normal maximum propeller speed when the difference between the pressure in the conduit 3 and drain pressure falls below a predetermined value. These adjusting means comprise a first piston and cylinder assembly 11, 12. The left hand end of the cylinder 12 is communicated by a duct 13 with the fine pitch conduit 3 and the right hand end of the cylinder 12 is communicated with a drain through duct means 14, 15 and 16. The piston 11 has a piston rod 17 bearing against an abutment plate 18 between which and the valve 5 the spring 6 is engaged. The abutment plate 18 is movable towards and away from the valve 5 to adjust the loading in the spring 6. When the propeller is not running, and no pressure exists in the fine pitch conduit 3, the spring 6 drives the piston 11 to the left hand end of the cylinder 12 in the drawing and at the same time the spring 6 moves the valve 5 to the right in the drawing into its open position. The loading in the spring 6, in this condition, is arranged to be such that the flyweights 8 would overcome the action of the spring and close the valve 5 at a speed substantially below the normal maximum propeller speed, in the present example, at 80% of the normal maximum speed. When the propeller is running normally, pressure is present in the fine pitch conduit 3 and acts upon the left hand side of the piston 11. The area of the piston 11 is so chosen in relation to the normal minimum pressure of fluid in the conduit 3 that the piston 11 is then driven to the right hand end of the cylinder 12 in the drawing, thus loading the spring 6 to a value at which the valve 5 is not closed by the flyweights 8 until a normal overspeed of the propeller of 108% of the normal maximum speed in the present example, is reached. So long as the pressure in the conduit 3 remains above the normal working minimum, therefore, the governor 7 operates to close the valve 5 only when the propeller exceeds its normal maximum speed by a predetermined amount, in the present example 8%.

In the case in which sufficient leakage occurs from the conduit 3 appreciably to reduce the fine pitch pressure in the conduit the pressure acting on the left hand side of the piston 11 becomes insufficient to maintain the piston 11 displaced to the right in the drawing against the action of the spring 6 and the spring 6 drives the piston 11 to the lefthand end in the drawing of the cylinder 12, the spring 6 thereby being unloaded. The propeller speed would normally be in excess of 80% of normal maximum speed, so that the unloading of the spring 6 consequent upon its movement of the piston 11 to the left enables the flyweights 8 to move the valve 5 into its closed position thus trapping the hydraulic fluid in the right hand end of the cylinder 2 of the pitch change motor and preventing a reduction of pitch of the propeller.

If a failure occurs in the coarse pitch conduit 4 while the propeller is in the "on speed" condition, by which should be understood rotating at the speed called for by the constant speed unit, the pressure in the right hand end of the cylinder 2 of the pitch change motor falls and the piston 1 will tend to move to the right in a pitch-finding direction under the effect of the centrifugal blade twisting moment. The fine pitch conduit 3 will however be closed at the hydraulic valve of the constant speed unit so that the pressure in the conduit 3 will immediately fall and allow the piston 11 to move to the left. If the speed is in excess of 80% of the normal maximum speed the lock valve 5 will accordingly close and prevent loss of pitch.

While the propeller is in an "underspeed" condition, by which should be understood a speed less than that called for by the constant speed unit, the conduit 4 is connected to drain and failure of the conduit 4 produces no change of operation until the "on-speed" condition is reached, when the above-described sequence takes place. Conversely, when the propeller is in an "overspeed" condition, by which should be understood a speed greater than that called for by the constant speed unit, the conduit 3 is connected to drain to an extent depending upon the degree of overspeed, and pressure is maintained in it by the fact that the piston 1 is moving to the left in the drawing, that is to say in the direction to coarsen the pitch of the propeller. Failure of the coarse pitch conduit 4 halts this movement so that the pressure in the fine pitch conduit 3 falls below normal and, providing that the propeller speed is more than 80% of normal, the lock-valve 5 closes and prevents loss of pitch.

In Figure 3 there is shown a preferred addition to the adjusting means of Figure 1 for the purpose of balancing the transient pressure fluctuations which are caused in the fine and coarse pitch conduits 3 and 4 by the operation of the hydraulic control valve of the constant speed unit. This addition comprises a second piston and cylinder assembly 19, 21. The piston 19 is provided with a piston rod 20 which bears on the piston 11 so that load from the piston 19 is applied to the spring 6 through the piston 11. The left hand end of the cylinder 21 in the drawing is communicated by a duct 22 with the coarse pitch conduit 4, and the right hand end of the cylinder 21 in the drawing is communicated with the drain by a duct 23. In this arrangement the areas of the piston 11 and 19 are chosen in relation to the pressures normally present in the fine and coarse pitch conduits that both pistons are driven to the right hand end of their cylinders to load the spring 6 with the combined load on the two pistons when the propeller is operating normally. In normal operation of the propeller such combined load remains approximately constant since operation of the hydraulic control valve of the constant speed unit causes substantially equal and opposite simultaneous fluctuations of pressure in the coarse and fine pitch conduits. In view of this the areas of the pistons 11 and 19 are chosen to be equal. To balance any inequality in the pressure fluctuations mentioned above however it is of course possible to have the pistons 11 and 19 of correspondingly different areas. The combined load exerted by the pistons 11 and 19 is again arranged to effect loading of the spring 6 so that the governor 7 is able to overcome the spring 6 and close the valve 5 when the propeller reaches a speed of 108% of its normal maximum speed when the spring 6 is loaded, and 80% of its normal maximum speed when the spring is unloaded, and the system operates in a manner similar to that already described with reference to Figures 1 and 2, except that failure of the coarse pitch conduit 4 produces a direct action on the piston 19 as well as an indirect action on the piston 11, to bring about the unloading.

Although in the example just described the lock valve 5 is a piston type valve, the valve 5 may take the form of a lift valve to ensure maximum fluid tightness when closed.

We claim:

1. A variable pitch propeller comprising an hydraulic double acting pitch change motor actuable by hydraulic fluid under pressure to adjust the pitch of the propeller, coarse pitch fluid conduit means for leading hydraulic fluid under pressure to said pitch change motor to actuate the motor in the sense to adjust the propeller towards coarse pitch, fine pitch fluid conduit means for leading hydraulic fluid under pressure to said pitch change motor to actuate the motor in the sense to adjust the pitch of the propeller towards fine pitch, a normally open lock valve in said coarse pitch fluid conduit means, closing means operatively connected with said lock valve for closing the lock valve in response to the attainment of a propeller speed in excess of a predetermined value, a by-pass conduit by-passing the lock valve, a non-return valve in said by-pass conduit, which non-return valve is arranged to close when the pressure on the pitch change motor side of the non-return valve exceeds that on the other side of the non-return valve, and adjusting means responsive to the difference between the pressure in the fine pitch fluid conduit means and drain pressure, said adjusting means being operatively connected to adjust said closing means to cause said closing means to close the lock valve at a propeller speed below the normal maximum propeller speed when said pressure difference falls below a predetermined value.

2. A propeller as claimed in claim 1, wherein said closing means comprises a flyweight carried for rotation about the rotational axis of the propeller, the propeller comprising spring means urging said lock valve to its open position, and said adjusting means being operatively connected to adjust the loading in said spring means thereby to adjust said closing means.

3. A propeller as claimed in claim 2, wherein said spring means comprises a coiled compression spring and an abutment, said coiled compression spring engaging between the lock valve and the abutment which is movable towards and away from the lock valve to adjust the loading in the spring, and said adjusting means comprises a piston and cylinder assembly, duct means communicating the cylinder on one side of the piston with said fine pitch fluid conduit means, and duct means communicating the cylinder on the other side of the piston with a drain.

4. A propeller as claimed in claim 3, wherein said piston has a piston rod which bears on said abutment on the side thereof remote from said compression spring, said abutment being movable by said piston rod when the difference between the pressure in the fine pitch fluid conduit means and drain pressure exceeds said predetermined value, to load said compression spring, and being movable by said compression spring when the difference between the pressure in the fine pitch fluid conduit means and drain pressure falls below said predetermined value to unload the compression spring.

5. A propeller as claimed in claim 1, wherein said adjusting means comprises a first member subject to the difference between the pressure in the fine pitch fluid conduit means and drain pressure, a second member subject to the difference between the pressure in the coarse pitch fluid conduit means and drain pressure, and means for combining the loads produced upon said first and second members by said pressures and for acting upon said closing means with said combined load, the arrangement being such that the combined load remains substantially constant when transient pressure fluctuations of opposite sign occur simultaneously in the coarse pitch fluid conduit means and the fine pitch fluid conduit means.

6. A propeller as claimed in claim 5, wherein said first member is the piston of a first piston and cylinder assembly, said second member is the piston of a second piston and cylinder assembly and said adjusting means further comprises duct means communicating the cylinder of the first piston and cylinder assembly on the two sides of the piston of the assembly with said fine pitch fluid conduit means and a drain respectively, and duct means communicating the cylinder of the second piston and cylinder assembly on the two sides of the piston of the assembly with said coarse pitch conduit and a drain respectively.

7. A propeller as claimed in claim 6, further comprising a piston rod on one side of the piston of said first piston and cylinder assembly, which piston rod transmits load to said closing means, and a piston rod on one side of the piston of the second piston and cylinder assembly, which piston rod bears on the other side of the piston of the first piston and cylinder assembly.

8. A propeller as claimed in claim 7, wherein the piston rod of the piston of said second piston and cylinder assembly bears against the side of the piston of said first piston and cylinder assembly which is exposed to the pressure in said fine pitch conduit.

9. A propeller as claimed in claim 1, wherein the lock valve is a piston type valve, and the lock valve is urged to its closed position by drain pressure.

References Cited in the file of this patent

UNITED STATES PATENTS

| 2,343,416 | Keller | Mar. 7, 1944 |
| 2,745,499 | Berninger et al. | May 15, 1956 |
| 2,748,877 | Miller et al. | June 5, 1956 |

FOREIGN PATENTS

| 562,845 | Great Britain | July 19, 1944 |